United States Patent
Matsumoto et al.

(10) Patent No.: US 7,416,764 B2
(45) Date of Patent: Aug. 26, 2008

(54) PRODUCTION OF COMPOSITES ARTICLES COMPOSED OF THIN LAYERS

(75) Inventors: Yonetatsu Matsumoto, Kobe (JP); Peggy Diane Studer, Huningue (FR); Yong Zhao, Cambridge (GB); Stefan Barny, Oberwil (CH); Ranjana Changanbhai Patel, Little Hallingbury (GB)

(73) Assignee: Huntsman Advanced Materials Americas Inc., The Woodlands, TX (US)

( * ) Notice: Subject to any disclaimer, the term of this patent is extended or adjusted under 35 U.S.C. 154(b) by 39 days.

(21) Appl. No.: 10/495,028

(22) PCT Filed: Nov. 11, 2002

(86) PCT No.: PCT/GB02/05098
§ 371 (c)(1),
(2), (4) Date: Feb. 22, 2005

(87) PCT Pub. No.: WO03/041875
PCT Pub. Date: May 22, 2003

(65) Prior Publication Data
US 2006/0035034 A1 Feb. 16, 2006

(30) Foreign Application Priority Data
Nov. 13, 2001 (GB) .................. 0127252.5

(51) Int. Cl.
*B05C 5/00* (2006.01)
*B05D 1/02* (2006.01)
*B05D 1/36* (2006.01)
*B05D 1/38* (2006.01)
*B05D 3/06* (2006.01)

(52) U.S. Cl. .................. 427/407.1; 427/427.4; 427/487

(58) Field of Classification Search .................. 427/508
See application file for complete search history.

(56) References Cited

U.S. PATENT DOCUMENTS

| | | |
|---|---|---|
| 5,059,226 A | 10/1991 | Schneider et al. |
| 5,059,266 A | 10/1991 | Yamane et al. |
| 5,140,937 A | 8/1992 | Yamane et al. |
| 5,257,657 A | 11/1993 | Gore |

(Continued)

FOREIGN PATENT DOCUMENTS

EP 0609478 8/1994

(Continued)

OTHER PUBLICATIONS

Michael F. Weber et al., "Giant Birefringent Optics in Multilayer Polymer Mirrors", Science, vol. 287, p. 2451-2456, Mar. 31, 2000.

*Primary Examiner*—William P. Fletcher, III (57) ABSTRACT

A method is described of producing thin layers (below 10 μm in thickness) by directing droplets (preferably by inkjet printing techniques) onto precise locations on a substrate, the liquid of the droplets having a viscosity such that the droplets, on impact with the substrate, spread out to form relics on the substrate that are at least 1.4 times the diameter of the droplets in flight, adjacent droplets merging to form a continuous layer on the substrate. The droplets may have different compositions to form images within the layer. Successive layers may be added to built up a three dimensional structure whose properties can be tailored by the compositions used to build up a composite.

6 Claims, 2 Drawing Sheets

U.S. PATENT DOCUMENTS

| | | |
|---|---|---|
| 5,266,349 A | 11/1993 | Bok |
| 5,395,434 A | 3/1995 | Tochihara et al. |
| 5,539,074 A | 7/1996 | Herr et al. |
| 5,555,176 A | 9/1996 | Menhennett et al. |
| 5,567,349 A | 10/1996 | Kelly et al. |
| 5,593,617 A | 1/1997 | Kelly et al. |
| 5,855,836 A | 1/1999 | Leyden et al. |
| 5,945,463 A | 8/1999 | Kawabuchi et al. |
| 6,024,455 A | 2/2000 | O'Neill et al. |
| 6,149,072 A | 11/2000 | Tseng |
| 6,164,850 A | 12/2000 | Speakman |
| 6,182,907 B1 | 2/2001 | Nakagawa et al. |
| 6,197,397 B1 | 3/2001 | Sher et al. |
| 6,277,929 B1 | 8/2001 | Kitahara et al. |
| 6,280,063 B1 | 8/2001 | Fong et al. |
| 6,309,047 B1 | 10/2001 | Mantell et al. |
| 6,343,846 B1 | 2/2002 | Asano |
| 6,402,403 B1 | 6/2002 | Speakman |
| 6,503,831 B2 | 1/2003 | Speakman |
| 6,577,356 B2 * | 6/2003 | Onishi et al. ............... 349/32 |
| 6,586,494 B2 * | 7/2003 | Mejiritski et al. ........... 522/107 |
| 6,713,389 B2 | 3/2004 | Speakman |
| 2005/0072959 A1 | 4/2005 | Moia et al. |

FOREIGN PATENT DOCUMENTS

| | | |
|---|---|---|
| EP | 0974627 | 1/2000 |
| EP | 0980882 | 2/2000 |
| EP | 1227347 | 7/2002 |
| GB | 2330331 | 4/1999 |
| GB | 2330451 | 4/1999 |
| JP | 10244692 | 9/1998 |
| WO | WO97/48557 | 12/1997 |

* cited by examiner

PRODUCTION OF COMPOSITES ARTICLES COMPOSED OF THIN LAYERS

TECHNICAL FIELD

The present invention relates to production of films composed of thin layers using ink jet processes, that is to say layers with a thickness below 10 μm, more preferably less than 5 μm, especially 1 to 2 μm and it is contemplated making layers thinner than 0.1 μm. The term "layer" is intended to cover a single thickness of deposited material that forms, or is one of several layers that form, a film and the term "film" is intended to cover both free-standing films and films supported on a substrate.

BACKGROUND ART

It is known from the prior art to apply thin layers and films to a substrate using many techniques, for example printing and screen-printing. Inkjet and laser printers will also produce thin films of ink.

It is known to use jet printing techniques to form three dimensional objects; for example in U.S. Pat. Nos. 5,059,226 and 5,140,937 there is disclosed the direct jetting of curable materials onto a substrate. In WO 97/48557 and WO 99/19900, there is described a method of forming three dimensional features on a surface using successive drops of inkjetted material to build up a deposit. The deposit is generally built up vertically to produce three dimensional objects, for example Braille characters and multi-layer optical and electrical devices.

Plastic layers and films capable of controlling electromagnetic radiation are important. U.S. Pat. No. 6,024,455 demonstrates the application of such plastic materials. The method described involves the melt co-extrusion of two (isotropic) polymers to produce a laminate film made up of hundreds of thin, alternating, layers of the two polymers. The layers are 0.1 μm thick or thinner.

To achieve controlled final optical properties, it is essential that the layers are dimensionally precise in the micro and macro dimensions, as well as optically clear.

Careful choice of the polymers gives control of light absorption, transmittance and reflection. High speed film web formation from the method described in U.S. Pat. No. 6,024,455 is clearly possible. However, it is difficult with this method to vary, readily the macro, micro and nano properties within each layer and between each layer.

The alignment of liquid crystal phases is usually brought about by a polyamide alignment layer that is in contact with the liquid crystals; U.S. Pat. No. 5,539,074. U.S. Pat. No. 5,567,349 and U.S. Pat. No. 5 593 617 disclose forming the alignment layer by polymerisation under polarised light of a layer that has been applied by spin coating. EP 1 227 347 discloses a process of jet printing an alignment layer followed by depositing a layer of cross-linkable liquid crystal in a volatile diluent.

U.S. Pat. No. 5,855,836 discloses a hot-melt system, in which a solid formulation is heated until it melts and is jet dispensed in a desired pattern on to a substrate. It then cools and solidifies, and the sequence is repeated to build a 3-dimensional object. The formulation includes a reactive component which is finally activated to cure the object. Since wax like materials are used, the formed layers are opaque and this method forms thick layers, e.g. 50 μm. Another disadvantage here is that the materials available are extremely limited. A related process is described in U.S. Pat. No. 5,059,266 and U.S. Pat. No. 5,140,937 involving direct jetting of curable materials. This is used for forming shaped 3 dimensional objects and not films.

It is also known to use red, green and blue filters in liquid crystal displays, which are deposited by jetting suitable pigments contained in suitable binders and solvents into a well.

One common feature with the prior art techniques is that the dispensed droplets of liquid are directed onto specific locations on a substrate so that the droplets adhere to the substrate in substantially the precise areas that the droplets land in order that the resulting deposit produces an image or print with as high (fine) a resolution as possible. This makes it hard to form a layer of substantially uniform thickness. In addition, when resins or curable resins are jet deposited they are generally supported in a volatile diluent.

There is an emerging need to produce on demand thin films made up of resins having active functionality for various purposes. For example: some polymeric resins have an active property, which may for example be physical, chemical, optical, electro-optical, magnetic or electrical (e.g. birefringence/wave guiding effects from liquid crystalline resins), or light emitting effects from organic/inorganic light emitting resins, electrical conducting effects from conducting resins. In particular, the capability to vary and integrate a variety of such active resins, in their active state (i.e. as tracks or patterns or circuits), within a layerwise plastic frame around the active resin is contemplated to be important in the future. In particular forming the active resin from suitable monomeric, oligomeric (pre-polymers) resin mixtures would allow greater flexibility in controlling the final active properties required.

In the field of security printing, the art is looking for new methods of creating authenticating materials that cannot be reproduced unlawfully and yet can readily be verified. Having these security features embedded within thin layers of polymeric material(s) would yield unusual effects in addition to the effects from the layering structure U.S. Pat. No. 5,945,463 and U.S. Pat. No. 6,277,929 disclose a photocurable resin composition comprising a high molecular weight resin and a curable diluent that can be extruded to form a thick layer approx. 1 mm thick that is then photocured.

DISCLOSURE OF THE INVENTION

According to the present invention, there is provided a method of forming a film made up of at least one layer of at least one resin, which method comprises directing droplets of a liquid composition comprising:
  a) the said at least one resin; and
  b) a diluent for the resin, said diluent consisting of at least one curable diluent onto an array of locations on a substrate, the liquid composition being such that the droplets, on impact with the substrate, spread out to form droplet relics on the substrate that have a diameter at least 1.4 times the diameter of the droplets in flight, such that adjacent droplets merge to form a continuous latter of substantially uniform thickness on the substrate; and curing the curable materials in the continuous layer to solidify the layer, wherein said composition contains substantially no non-curable diluent and wherein the layer has a thickness of less than 10 μm.

The term "continuous layer" is intended principally to cover the situation when adjacent droplet relics spread out and join together to form a thin uninterrupted layer but is not intended to exclude either layers with occasional voids (although void-free layers are preferred) or layers that are deliberately shaped to form the overall shape of the article, e.g. to form wells and channels in layers by not depositing droplets in selected areas of an otherwise uninterrupted layer. Rather the expression "continuous layer" is intended to exclude layers made up solely of discrete unconnected areas as, for example, in the case of half tone printing.

The term "resin" used herein means a monomer, an oligomer or a polymer having a weight average molecular weight in excess of 500 daltons. It may be reactive, i.e. capable of cross-linking or polymerising, or non-reactive. It preferably has a physical, chemical, optical, electro-optical, magnetic or electrical activity. It may have a molecular weight higher than 750, e.g. higher than 1,000 daltons.

The term "droplet relic" means the layer of liquid formed by a droplet after impact with the substrate.

The viscosity of the liquid is important to allow the droplet relics the spread out. The droplet compositions used should have a viscosity of less than 70 cps, e.g. 2 to 70, e.g. 2 to 30 cps at room temperature or jetting temperature, if different, to provide the integration of adjacent droplets and to be compatible with commonly-used heads for producing the jets (e.g. piezojet systems). More preferably, the viscosity is 10-40 cps as a reasonable balance between fast jetting by piezo action and good resolution. Too low a viscosity can lead to loss of resolution due to excessive image spread and splatter and too high a viscosity can lead to unstable jetting conditions.

The jetted liquid used in the droplets contains a resin that can have a viscosity of from 2 to over 500 cps at room temperature; for examples compounds having molecular weight greater than 500 daltons will yield compositions that are high viscosity or are solid, and thus not readily jettable. The use of a diluent in the droplet composition reduces the viscosity of the resin and so allows it to be used in a composition that can be jetted.

Volatile solvents have been used in the prior art to bring the viscosity of a composition down to a level that allows them to be jetted. Such solvents can be problematical as the volatile solvent can evaporate, leaving high viscosity resin in the jetting equipment, causing jet nozzle blocking and resulting in patchy coatings with no easy continuity between droplets and within a droplet. This is especially problematic when jetting at elevated temperatures, e.g. above 40° C., generally above 50° C. and typically at 60-85° C., since such temperatures lead to increasing solvent loss. On the other hand, such temperatures are desirable for compositions having a high proportion of high molecular weight resins (e.g. with molecular weights above 400 or 500 daltons). Compositions having volatile solvents should therefore ideally be jetted at room temperature, which in turn means that they can only have a low content (<10%) of the resin in order to bring the viscosity of the liquid composition being jetted into the range of viscosities that can be jetted. Forming good quality films from such compositions, having a low content of the functional active resin of interest, is difficult. More powerful solvents may be used, such as chlorinated solvents, which can dissolve higher amounts of the active resins: however there are growing concerns regarding the environmental impact of these solvents.

We have found that reactive solvents or diluents (the term "reactive" and "curable" are used synonymously in describing the present invention), that is to say solvents and diluents that are cured following jetting, help considerably in achieving the low viscosity necessary to achieve stable jetting conditions when using compositions containing substantial amounts of the active resin or resin mixtures. The use of such reactive diluents also assists in the merging of adjacent droplet relics as they spread out following the impact of the droplet with the substrate. Most importantly, by careful selection/matching of the reactive diluent with a curable or non-curable resin of interest (including mixtures thereof), films can be achieved solely by jetting techniques that retain the activity/property sought from the resin. Nozzle blocking is reduced or eliminated and better quality films can be achieved, compared to those from compositions containing volatile solvents. Environmentally damaging solvents can also be avoided in this way.

Preferably, the reactive diluent is present in the range 10 to 80%, e.g. 30 to 60% or 40 to 70% by weight, more preferably 40 to 60% by weight. Too low a content of the diluent (e.g. less than 10%) with high molecular weight resins (e.g. greater than 500 daltons) can result in high viscosity compositions (e.g. >70 cps at 80° C.), necessitating higher operational temperatures (>100° C.) for the ink jet printhead. This can affect the stability of the resin held at such elevated temperature prior to jetting and can lead to a greater tendency of printhead nozzles to become blocked. A high content of the reactive diluent (e.g. >80%) can yield very good jetting properties at reasonable temperatures (<100° C.): however the final film properties can be impaired by the presence of large amounts of cured diluent. Thus, clearly these are scale-able composition ratios (i.e. ratios that can be varied), depending on the final resin activity required, and the best jetting and curing properties.

Although the droplets must be liquid, they may also contain suspended solids.

If the final product is a self-supporting film, it can be removed from the base substrate after the article is formed; however, the article will generally be retained on the base substrate and is preferably firmly adhered to that substrate.

By producing a droplet relic with a diameter of at least 1.4 times the diameter of the droplet, spaces between adjacent droplets can be "filled in". This is achieved according to the present invention by a suitable choice of the rheology (principally of the viscosity and surface tension) of the droplets and the jetting conditions taken in combination with the surface properties of the substrate. Any substrate may be used in the present invention, e.g. glass, plastics, metal etc, that allows liquid droplet relics to spread out and join with adjacent droplet relics to form a continuous layer. If the base substrate does not have suitable surface properties to cause such spreading, then the surface may be treated or coated. Naturally, since multiple layers may be deposited, a preceding layer can form the substrate for the deposit of a subsequent layer and so the materials of each deposited layer should be chosen to provide a suitable surface for the spreading of the droplets applied in subsequent layers.

Another important rheological characteristic in order to achieve blending of adjacent droplets to provide a layer of substantially uniform thickness is the surface tension of the liquid forming the droplets which should be less than 70 dynes cm$^{-1}$ preferably less than 40 dynes cm$^{-1}$ and will generally be in the range of 20-70 dynes cm$^{-1}$ since this allows the droplet to blend smoothly with adjacent droplets, lines or complex patterns, forming thus a smooth layer; this provides the possibility of forming complex micro-properties in the thin layer by using droplets of different composition to form the layers (both within any layer and between layers).

Preferably the surface tension of the substrate should be of the same order of magnitude as the droplets.

As it will be appreciated, a droplet must remain liquid on impact with the substrate and must remain liquid for a period of time to allow it to spread out to form the required layer. It has been found that jetting at higher temperatures (e.g. 50° C., more generally 70° C. or higher) of curable materials in reactive diluents yields surprisingly thin films having required final properties. However, it is within the scope of the present invention for some of the droplets to be composed of a liquid that will not to spread out in the manner described above in which case such droplets will be embedded in the formed layer. This might be useful, for example, to form a line of precisely located non-spreading droplets that makes up a light guide or an electrically conductive path.

The ratio between the diameter of the final droplet relic on the substrate and the diameter of the droplet in flight is preferably substantially greater than 1.4:1 and most preferably at least 5:1 and more preferably at least 10:1, e.g. 15:1 or 20:1 or above. By allowing the droplets to spread to form the droplet relic, the thickness of the deposited layer naturally decreases and it is to achieve thin films that the present invention uses a substantial spacing between the deposited droplets. For example, a droplet relic having a diameter of 73 μm (36.5 μm radius) formed by the spreading out of a droplet of 20 μm diameter (10 μm radius) from a jet having a nozzle diameter of 20 μm will have a thickness of 1 μm. If the droplet relic spreads out to a diameter of 103.2 μm (radius 51.6 μm), the relic will have a thickness of 0.5 μm.

The diameter of the droplet relics will often be difficult to measure when adjacent relics merge; if the relic caused by individual droplets is not possible to discern in the deposited layer, it can be calculated by reference to the thickness of the layer and the diameter of the original droplets using the formula:

$$r^2 \cdot t = 4/3 s^3$$

where r is the radius of the droplet relic;

t is the thickness of the layer; and s is the radius of the droplet.

In order to provide for a substantial spread of the droplets, the droplets should be jetted from a jet head at high speeds. The speed will depend on the degree of spread required and the viscosity of the liquid used. The droplets may generally be dispensed by the jetting head at velocities preferably between 0.5 and 2 m/s. more preferably 1 to 1.8 m/s. If the speed of the droplets is too high, it may spread unevenly and splatter. Thus, the speed will have to be set by trial and error according to rheology of the droplets and the substrate or, more likely, the rheology of the droplet should be selected on the basis of the jetting speed of the jetting head used. It is found that reactive diluents specifically aid spreading of the high-speed jetted droplet without break-up into random, uneven shape and consequent non-continuous films. The reactive diluent ideally should have a surface tension, and chemical/physical characteristics matched to those of the principal resin or curable component.

The use of elevated jetting temperatures e.g. above 40° C., generally above 50° C. and typically at 60-120° C., reduces the viscosity of compositions and allows them to be jetted: Such conditions help further in spreading the jetted droplet on the substrate to achieve the required thin film and this is especially beneficial when the substrate is thermally insulating (e.g. plastics surfaces)

Thus, the spreading of the droplet relics is a scaleable feature depending on a number of features, including original droplet size, viscosity of composition at the best jet operational temperature, surface tension of the droplet and the substrate and the jetting speeds achievable under stable jet conditions.

The droplets may be jetted at high jet firing frequency, preferably 5 to 20 kHz line frequency and preferably 40-100 kHz individual jet frequency. Future development may achieve higher frequencies, e.g. 300kHz, and such speeds may lead to higher droplet velocities.

Curing should be achieved as soon as possible after the droplets have spread out to form the layer (the term "curing" includes the polymerisation, isomerization and/or cross linking of the molecules and the liquid). Preferably, the curing involves a condensation reaction, as described below.

It has been found that curable (reactive) diluents not only enable the low viscosity required for jetting to be attained, but also surprisingly helps with the intimate mixing and curing of adjacent droplets in the same layer, and also increases the adherence of one layer to an earlier deposited layer in a multi-layer system. This effect yields much tougher laminar composites due to better adhesion inter and intra droplet. This adherence effect probably involves wetting, swelling, and partial dissolving phenomena, such that jetted droplets spread and blend smoothly without the presence of fracture and defect-forming voids. Reactive diluents are advantageous as they will become incorporated into the finally formed layer or film and, in contrast the use of non-reactive volatile solvents, will not give rise to vapour emission and/or free liquid within the layer. Troublesome drying regimes to remove residual non-reactive solvents can thus be avoided.

As stated above, the diluent is preferably present in the range 10 to 80%, e.g. 30 to 60% or 50 to 70%, more preferably 40 to 60%. It makes little difference whether percentages are measured by volume or by weight. It is appreciated that these are scaleable properties depending on layer thickness, number of reactive sites in the components in the curable droplets, e.g. hydroxy or amino number, and swelling characteristics of the cured layers on addition of the diluent/curable fluid resin.

The construction of a laminar article layer-by-layer allows different liquids to be jetted during the construction of each layer or in different whole layers or multi-layers, thus affording differing and unique micro and macro properties of strength, toughness and flexibility. The different liquids may form, after deposition and curing, a visual or machine-readable image. Random or repeating programmed patterns may be formed to achieve smooth, void free final properties. Deliberately designed repeating voids maybe formed surrounded by a toughened resin matrix to yield complex membranes. The techniques described above can be used for example to produce, tracks or patterns that have different refractive index from the surrounding area, and thus be used for wave-guiding purposes. The patterns may be disposed flat in one layer or be 3-dimensionally disposed over several layers.

Because each droplet is individually jetted, it is possible to jet the droplets from one or more different jetting heads and the droplets jetted from these heads may be the same or different. By applying droplets of differing compositions in any layer, it is possible to vary the layer pixel to pixel (i.e. droplet to droplet), line to line and/or layer to layer to build up a desired pattern of materials in thin layers. Thus thin complex laminar articles can be formed by jet printing techniques. When jetting different materials it is not necessary for the deposit thickness of each material in a layer to be the same. For example, a deposit making up part of a lens could have a thickness of 2 μm while the surrounding material could be made up of a much thinner layer, e.g. less than 1 μm thick.

In addition, two or more different liquids that together form the components of a curable resin may be jetted or sprayed simultaneously from adjacent jetting or spraying printheads such that the liquids combine either in flight or on the surface of the substrate. The components can also be jetted sequentially onto the same site to provide the curable composition. This process is particularly useful for jetting traditional two component adhesive resin mixtures, which have to be held separately until used.

The nozzle system employed in the present invention is preferably equivalent or identical to that used in inkjet printing systems, preferably piezo inkjet systems. Preferably, the size of the nozzle openings is as small as possible; with currently available inkjet systems, such openings are in the range of 10 to 50 cm. The size of the applied droplets may correspond to the size of the nozzle opening, i.e. in the range 10 to 50 μm, or may be bigger (80-100 microns): the nozzle openings may become in smaller in the future, e.g. about 1 μm or smaller, even as small as a few hundred nanometres, thus allowing correspondingly sized droplets to be applied.

Alternatively, the droplets can be in the form of so-called "microsprays" which are formed from droplets subjected to acoustic waves which break up the droplets into even finer droplets, see for example U.S. Pat. No. 6,182,907 (Mitsubishi Corporation) and U.S. Pat. No. 6,309,047 (Xerox Corporation). What is critical is that the jetted droplets and the droplets of the micro-spray should be directed at specific target locations on the substrate such that the droplets merge to form a continuous layer.

The process may include the step of varying the number of pixel drops, that is to say the number of droplets applied to each location and/or varying the volume of the applied liquid per pixel, per line applied and/or per layer, in order to achieve variable properties in the article. Another following jet may cover same previously addressed area.

Highly precise and complex layers can be fabricated with fine detail. Different fluids/components can be dispensed pixel-wise, line wise and layer wise within these address schemes, with further differentiation possible through clustering in the pixels, lines and layers in a random or configured manner, to provide even more material property variation. It is thus possible to apply, in a single pixel, several individual droplets (i.e. a cluster of droplets) to provide, for example, an optical lens by making the individual droplets of materials of different refractive index. Alternatively fractal patterns can be formed in an individual pixel. These patterns are part of the whole film layer.

By combining the compositions with programmable piezo (array) printhead technology, it is possible to vary micromaterial properties of the formed laminar coating, to achieve strength, texture and variable macro properties. As pixel addressability with piezo printheads can be as fine as 20 μm spots, the resulting resolution can match the resolution achievable using laser address systems. This addressability will go even higher with the use of nanojet technology delivering picoliter volumes of liquid, or less.

The process lends itself very conveniently to the production of films from a digital representation held by a computer, and is particularly suitable for use with CAD systems. Thus, a film can be designed using CAD and light ray tracing software, the digital information can be converted to a series of laminae in digital form and the digital representation of the laminae can be used to control the delivery of the applied liquid sequentially on to successive layers of the deposited in order to reproduce the film. The techniques can be used for rapid prototyping and even rapid manufacture of specialist single or multi layer films. Thus the pattern of pixel-producing droplets in each layer can be designed using standard CAD design techniques incorporating ray tracing software (which can define detail within each pixel, e.g. refractive index) and the CAD program can be used for controlling printer heads in a manner that is known.

It is mentioned above that an image can be formed by applying different liquid compositions. Eye- and machine-readable images can also be formed by building pixels of a light modifying layer to a greater thickness than the surrounding areas either by making the film thicker in the desired location by increasing the density of the droplet deposits (i.e. depositing more droplets per unit area of the substrate) or by applying more than one droplet to a given pixel and/or by varying the compositions of the liquids used across the layer. The light modifying material may be for example a pigment or a dye or, as described below, a liquid crystal.

The whole process of forming single thin films or complex multi layer films can be done "web to web roll" as, for example in conventional rotogravure, with the jetting occurring in line at high speed. The different fluids can be dispensed one after another in a serial manner, as the substrate web moves past the printheads dispensing the different fluids. The web may be suitably primed or surface treated, in-line or off-line, to the manufacturing process.

In one embodiment, the substrate remains stationary and the jetting nozzles track across it. However, the nozzles may be held fixed and the substrate moved. In either case, the process can be applied simultaneously to a number of substrates by forming the layers on respective substrates and either moving the nozzles across the several substrates or moving the several substrates relative to the nozzles, which is particularly useful in forming large displays.

Polymers, oligomers, and/or monomers may be used as the resin in the jetted compositions. The resin may itself be curable.

The curable resins can involve compounds which can undergo condensation reactions. These reactions can be triggered either by thermosetting reactions such as epoxy/amine or isocyanate/polyol/amine etc., or by electromagnetically triggered cationic systems such as cyclic ether compounds (epoxy, oxetane, cycloaliphatic epoxy, etc), cyclic lactones, cyclic acetal compounds, cyclic thioether compounds, spiro-orthoester compounds and vinyl compounds, plus cationic photo-initiator salts (e.g. diazonium, sulfonium, iodonium or ferrocenium), or radically cured systems such as acrylates, methacrylates, allyl urethane, urethane acrylates, epoxy-acrylates, unsaturated polyester compounds, plus radical photoinitiators (e.g. acetophenone series, benzion series, benzophenone series, thioxanthone series, phosphine oxides, alkyl borates, alkyl triphenyl borates, iodonium salts). Alternatively, they may undergo photo-dimerisation or a Diels Alder reaction, e.g. cinnamates.

In the thermosetting case, the reactants can be separately included in two liquids such that on jetting, the two components react to form the condensation product. In the photosetting case, the electromagnetic radiation can be administered imagewise in synchronisation with the liquid jet activation, pixel-by-pixel, line-by-line or a whole layer may be irradiated simultaneously. Suitable initiators should be employed.

Polymers of the type disclosed in U.S. Pat. No. 6,277,929 can also be used in the present invention.

Preferably, the curable diluent include ring opening compounds, e.g. epoxy, polyepoxy, thiiranes, aziridines, oxetanes, cyclic lactones, cyclic acetals; addition compounds such as vinyl-ethers; polymerising compounds such as ethylenic and (meth) acrylate, hydroxyacrylates, urethane acrylates and polyacrylates; hybrid compounds, such as epoxy-ac)tlates, isocyanurate-epoxy, epoxy-silane advanced resins and polyurethane silanes; siloxanes containing ring opening or polymerising groups; and condensing resins such as isocyanates. The resin which is dissolved in the curable diluent may be a single component having similar reactive groups as the diluent, or may be a polymer made by polymerising the reactive diluent. The curable diluent may be a hybrid composition of above active components. The term "hybrid" is defined as containing compounds with two different reactive groups e.g. epoxy and acrylic or other functionalities, either in the same compound or in different compounds in the same composition. The resin layers may additionally contain additives such as fillers, reactive or not, organic fillers (e.g. core shell), inorganic fillers (glass spheres/fibres/flakes, alumina, silica, calcium carbonate etc), pigments, dyes, plasticisers, or pore formers etc. Nano particles may be dispersed in the jet fluids to achieve strengthening or optical effects.

In the preferred systems, the reactive diluent is a photopolymerisable vinyl type monomer, or an epoxy type monomer. The choice is dependent on the type of the resin being used in the composition: acrylate diluents may be used for acrylic resins and epoxide diluents for polyethers or photosensitive epoxy systems, and mixtures of acrylics and epoxide diluents for mixed resin or mixed photosensitive systems.

Representative examples of the photopolymerisable vinyl type monomer are hydroxyalkyl acrylates such as 2-hydroxyethyl acrylate, 2-hydroxybutyl acrylate, etc.; mono- or diacrylates of glycols such as ethylene glycol, methoxytetraethylene glycol, polyethylene glycol, propylene glycol, etc.; acrylamides such as N,N-dimethylacrylamide, N-methylolacrylamide, etc.; aminoalk-yl acrylates such as N,N-dimethylaminoethyl acrylate, etc.; polyvalent acrylates of polyvalent alcohols or ethylene oxide or propylene oxide adducts thereof such as hexanediol, trimethylolpropane, pentaerythritol, dipentaerythritol, tris-hydroxyethyl isocyanurate, etc.; phenoxy acrylate, bisphenol A diacrylate and acrylates of ethylene oxide or propylene oxide adducts of these phenols, etc.; acrylates of glycidyl ethers such as glycerin diglycidyl ether, trimethylolpropane triglycidyl ether, triglycidyl isocyanurate etc.; and melamine acrylate, and/or methacrylates corresponding to the above acrylates, etc.

Epoxy diluents include monoepoxides, such as n-butyl glycidyl ether, iso-octyl glycidyl ether, phenyl glycidylether, cresyl glycidyl ethers, glycidyl esters of mixed tertialy, aliphatic, monocarboxylicacids, glycidyl acrylate and glycidyl methacrylate; or di-epoxides such as diglycidyl-butane-diol, UVCUBE1500 bis cycloaliphatic epoxide; or oxetanes, furans; or vinyl ethers etc. if possible.

The diluents, e.g. acrylates, epoxides and hybrids, are preferable di-functional, as difunctionality can give useful crosslinking and film forming properties. However mixtures of mono- with di- and/or greater functionality may also be used.

The curable diluent preferably has a weight average molecular weight of less than 300 daltons.

The diluents as described above are used singly or as a mixture of two or more of them. The suitable range of an amount to be used is 20 to 300 parts by weight, preferably 30 to 150 parts by weight based on 100 parts by weight of the active resin compositions.

As indicated above, it may be that a first droplet is jetted and a second droplet is delivered over the first droplet as a trigger to cure the first droplet. Preferably, the active component in the second droplet may be a radiation photosensitive radical and/or cationic photoinitiator and/or a catalyst. The active component in the second liquid may comprise nano particles, either directly reactive via surface groups (such as epoxy, acrylic, hydroxy, amino etc) or contained as dispersions in an active component.

If the curable material in the droplets is photocurable, irradiation could take place pixel by pixel, line by line or layer by layer, and/or after several layers have been formed, and/or after all the layers have been formed. Preferably, electromagnetic radiation is employed. Suitable sources include UV light, microwave radiation, visible light, laser beams, and light emitting diode arrays, and other similar sources. Light management could involve light valve array technologies. The present invention can be applied to build up a thick deposit of resin composed of many layers. By curing each layer as it is deposited, it is possible to achieve superior properties resulting form homogeneous curing as compared to the situation when all the layers are cured simultaneously and as compared to curing a thick deposit of resin formed in one operation.

The irradiation maybe synchronised to the absorption and reactivity rates of the jet-applied liquid onto the previous cured layer material. This may involve the application of the electromagnetic irradiation after the liquid has ingressed to a degree into the previously formed thin layer, or the irradiation may be during the flight of the applied fluid from the jet device to the surface of the deposited previous cured layer. When forming alignment layers for liquid crystals (see below), the layer should also be irradiated following formation of the layer, to cure, e.g. by dimerisation, the photoactive groups of the linear photopolymerisable polymer (LPP), thereby forming a layer that orientates the liquid crystal molecules applied in a further step.

It will be appreciated that by using the techniques of the present invention, it is possible to build up three dimensional articles or films out of successive layers; especially in the form of laminated blocks and items with complex shapes. By varying the characteristics across the layers including layer thickness, as they are formed, optionally on a micro-scale, it is possible to instil desired a functionality in the finished article. This functionality can take many forms: many interesting proposals have been made for making optical, electro-optical and electrical components out of resins. Although the precise details of such devices do not form part of this invention, the present invention does allow a simple and effective way of making such components. Some details are nevertheless given below. In the case of optical components, the invention enables the optical properties of a component to be varied layer by layer and across each layer, and each layer can be of varying thickness and refractive index, thereby enabling complex optical multi-layer films to be produced.

Complex layer structured articles may be realised, having integrated complex shapes with laminar film blocks having optical, electro-optical, magnetic etc patterns, as well as macro-mechanical, colour and texture properties.

It is possible to build the component onto a substrate, which is then retained as part of the final finished article. Such a substrate might be a glass or a plastics sheet which could for example form part of an optical component.

The optical properties of the layers may be varied both within each layer and between layers, for example selective wavelength refractive/transmissive properties can be produced in random or patterned way. Furthermore, the layers can be of different thicknesses, involve different materials (thus varying the refractive index from layer to layer, in a random or patterned way) and each layer can itself be formed with a prescribed topography by varying its thickness over its extent. The topography between and in layers can be patterned, thus achieving optical effects. The patterns can be planar (i.e. within a layer) or can be 3-dimensionally disposed circuits within the laminar structure. Areas within a multi layer film maybe transparent or opaque. It will also be appreciated that, using the techniques of the present invention, it will be possible to produce so-called "smart cards" which might include high information content images, e.g. a hologram, a photograph (which could be digitally ink-jetted and coloured) or a watermark-like feature (which could be UV fluorescent). The laminar structure and the adhesive nature of the inter-laminar relationship leads to a considerable degree of security. This means that the structure can be used in situations where high-security printing is used, e.g. in authenticating software and other licensed copyright works, such as music and video carriers, or in security documents, security passes, identity cards, banking cards etc..

One important aspect of the present invention is its application to the deposition of liquid crystal alignment layers (so-called LPP (linear photopolymerisable polymer), which may be acrylic-based) and the subsequent deposition of a liquid crystal monomer layer (so-called LCM) that, on curing, forms liquid crystals (so-called LCP (liquid crystalline polymer)). Suitable materials are described in U.S. Pat. Nos. 5,539,074; 5,567,349 and 5,593,617 and available from the Applicant. Liquid crystals demonstrate birefringence, which occurs because the plane of polarised light is twisted as it passes though a layer of aligned liquid crystals. Birefringence can be seen by placing a liquid crystal layer between a pair of cross polarised filters. As the liquid crystal layer is rotated relative to the polarised filters, so the light transmitted through the sandwich formed by the polarisers and the liquid crystal layer changes in intensity. In addition, the colour of the transmitted light vary depending on the thickness of the liquid crystal layer. For example with a liquid crystal system available from the Applicant, CB 483, Staralign 2130 having a delta n value of 0.117, it is possible to alter the colour of light transmitted when placed between cross-polarisers by altering the thickness of an LCP layer as follows:

| Thickness of liquid crystal layer (µm) | Colour |
|---|---|
| 3.5 | yellow |
| 4.1 | red |
| 4.6 | purple |
| 5.1 | blue |

The brightness of the light from the LCP can also be varied by a cholesteric LCP. The cholesteric layer reflects a narrow band of light and the efficiency of the reflection is dependent on the thickness of the LCP layer. Thus the ability of the present invention to deposit a thin layer of LCP can be used to tailor the colour and brightness of the light transmitted by the layer. By varying the thickness of the LCP and/or the orientation of the liquid crystals between delimited areas or domains within a layer (such that, within each area or domain, the layer is homogeneous and of uniform thickness), and optionally also building up several layers in each domain, a highly complex image can be formed reproducibly by an authorised manufacturer that is very difficult for any unauthorised person to replicate. The image may be machine readable. A film built up in this way can include artefacts deposited by the method of the present invention, e.g. a waveguide. disposed within a layer or three dimensionally within the surrounding layered structure in a seamless manner that makes unauthorised reproduction even harder to achieve. This means that an LCP formed in accordance with the present invention has special application for high security and smart cards and as a means of authentication of, for example, credit/debit cards, documents, certificates, software and audio products, as discussed above. Instead of LCPs, other resins, e.g. resins containing anti-counterfeit dyes, can be used for security and validation applications.

In the case of liquid crystalline polymers, the preferred diluent is an acrylate or methacrylate that preferably contains one or more aromatic ring, preferably a benzene ring, e.g. butanediol diacrylate, hexanediol diacrylate, isobornyl acrylate, phthalic acid mono hydroxyethyl acrylate, N-vinyl pyrrorydinone, tetrahydrofurfuryl acrylate, methyl methacrylate, propyleneglycol diacrylate, trietlyleneglycol acrylate, neopentylglycol diacrylate, cyclohexyl acrylate, lauryl acrylate, most preferably, benzyl acrylate and phenoxyethyl acrylates. It is preferred that the curable diluent is mono-functional.

Other specific applications for the present invention include:
1) to build up optical materials, such as the mirror described in an article by Michael F. Weber et al Science, Vol. 287, 31$^{st}$ Mar. 2000 (page 251).
2) to produce a micro embossed pattern on a film to control adhesion of the film to a substrate, as described, for example, in U.S. Pat. No. 6,197,397.
3) to build up complex polymer films, for example a brightness enhancer as described in U.S. Pat. No. 6,280,063.
4) to form multi layer thin films wherein the refractive index varies between each layer, to produce selective transmission, reflectance & absorption effects.; an example is the films that are currently formed by melt co-extrusion of polymers, see for example U.S. Pat. No. 6,024,455. In this present application, the refractive index can be varied by changing the polymer/ oligomer/ monomer chemical functions, or by changing content of nano-particles per layer. The key requirement here would be to achieve very thin layers (0.1 micron or lower)
5) to form multi layers having variation/patterning of optical micro-properties within the layer, e.g. formation of micro lens and wave guiding optical effects
6) Multi layers having integrated micro-optoelectronic elements fabricated within the layers.

BEST MODE FOR CARRYING OUT THE INVENTION

Figure 4:
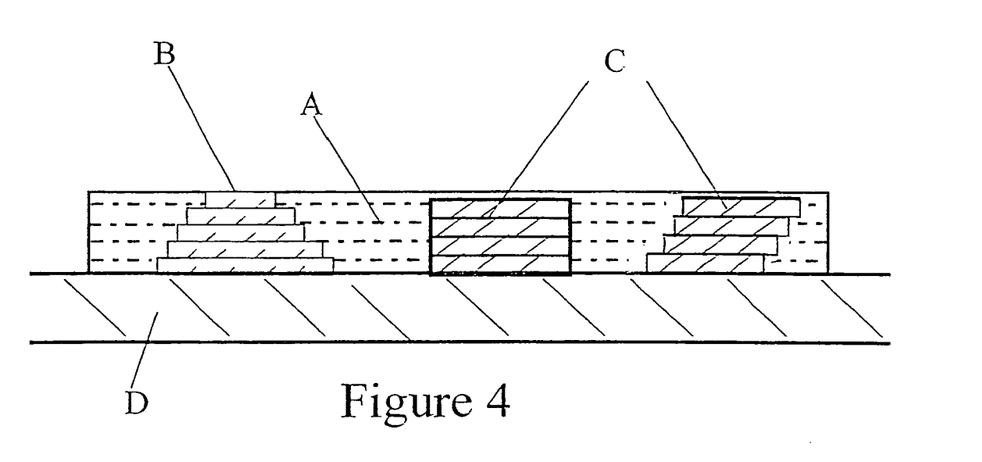
FIG. 4 is a schematic representation of a film made according to the present invention.

Referring initially to FIG. 4, there is shown a series of isotropic layers A less than 10 µm thick made by jetting a resin in a curable diluent onto a substrate D. Also jetted are a lens B and waveguides C made up of an anisotropic material. The deposited layers of the lens B and waveguides C can be thicker than that of layers A, which form the base material of the film while lens B and waveguides C represent optical features embedded in the layer A to form a coherent multilayer film.

The invention may be carried into practice in various ways and some embodiments will now be described by way of illustration in the following Examples.

EXAMPLE 1

A Jetlab ink jet printer (obtainable from Microfab Technologies Ltd, Texas, USA) was used for jetting droplets onto a substrate. This equipment can precisely control the volume of jet droplet and printing pattern. The printer incorporates a piezo printhead. the temperature of which can be controlled, which enables the jetting of fluids at elevated temperatures that have an excessively high viscosity at room temperature.

The jet performance is dependent on physical properties of fluids such as viscosity and surface tension. Therefore, investigation of jet performances as a function of viscosity and surface tension was undertaken to find appropriate jet conditions for various fluids. A number of low-viscosity acyl ate monomers were selected due to their fast UV cure as well as good physical properties and jetted onto a substrate at room temperature.

TABLE 1

| Fluids | Supplier/Code | Surface Tension (mN/m) | Viscosity (MPas) | Dwell Voltage (V) |
|---|---|---|---|---|
| TPGDA | Genomer 1230 | 34* | 17 | 30 |
| HDDA | Genomer 1223 | 35* | 6.3 | 22 |
| PONPGDA | Gray Valley, SR9003 | 32* | 10.7 | 25 |
| TEGDA | Gray Valley, SR272 | 40* | 13.4 | 30 |
| DPGDA | Gray Valley, SR508 | 34* | 8.1 | 22 |

The monomers referred to in Table 1 are:

The acrylates in Table 1 were sensitised to UV curing by using 3 wt % of IRGACURE 184 photoinitiator, obtainable from Ciba Specialty Chemicals in Basel, Switzerland.

The viscosities (measured using a Brookfield Digital Viscometer, Model HBTDCP, Spin Rate 100 rpm at room temperature) and dwell voltages for optimum jetting are listed in Table 1. Generally, it can be seen that lower viscosity fluids need lower dwell voltage for optimum jetting.

EXAMPLE 2

A number of droplets were directed at the same target area on a substrate at room temperature and the extent of spread of the resulting spot was measured on a video screen connected a digital (CCD) camera.

Figure 1:
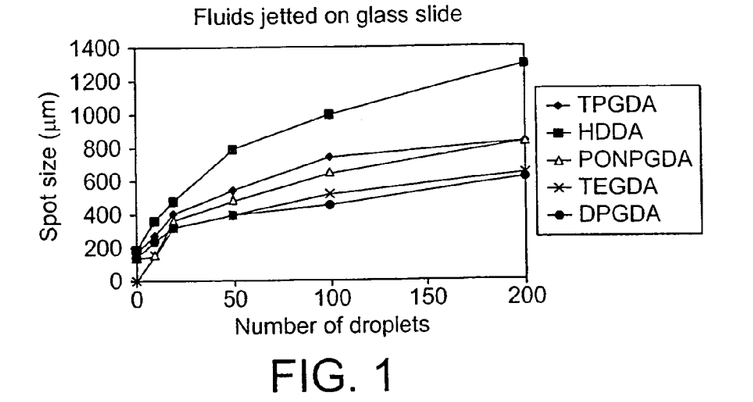
FIGS. 1 to 3 are graphs showing the result of tests described below in Examples 2 and 3.

Each droplet had an in-flight diameter of approximately 50 μm. The number of droplets deposited on the spot was varied and the size of the spot (after spreading) was plotted against the number of droplets used to form the spot. The results for the jetting of various monomers onto a glass substrate are shown in FIG. 1.

As can be seen, the spot size increases with the number of droplets but not, however, as a linear relationship. The degree of increase is reduced as the number of droplets increases.

Figure 2:
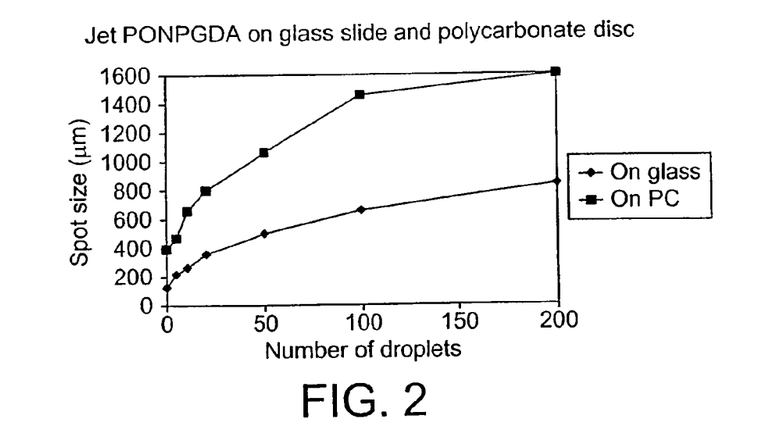

PONPGDA droplets were jetted onto the same target on a glass slide and a polycarbonate disc. The results are shown in FIG. 2.

As can be seen, the spot size of jet fluids on the polycarbonate substrate is much larger than that on the glass slide, because PONPGDA is more compatible at a molecular level with polycarbonate than with the glass slide. Thus, the hydrocarbon character of polycarbonate leads to better spreading.

EXAMPLE 3

Figure 3:
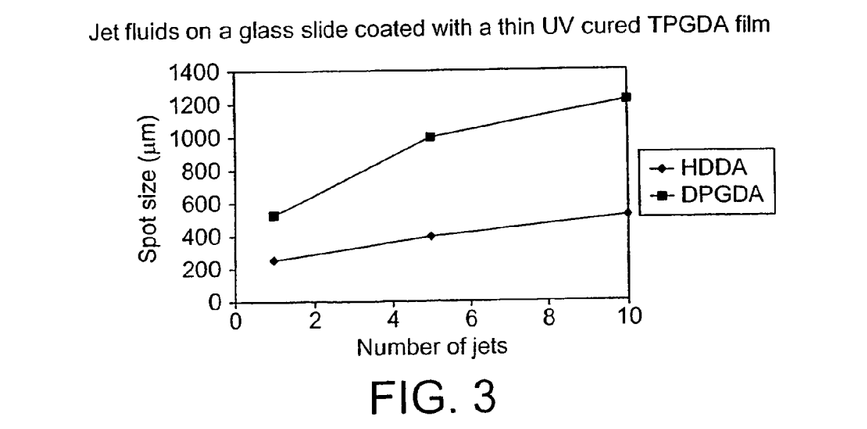

Three fluids: PONPGDA, DPGDA and HDDA were jetted at room temperature onto the same target area of a glass slide coated with a thin film of UV-cured TPGDA. Of the three fluids, the surface tension of PONPGDA is lowest and is lower than that of the substrate TPGDA film. The spot size of PONPGDA is very large and a ring is formed, making it difficult to form a continuous film. The results from the other two fluids are shown in FIG. 3.

Thus it can be seen:

Jetting a fluid (PONPGDA) whose surface tension is lower than that of substrate leads to poor film formation.

Fluid (HDDA) with higher surface tension than the substrate-forms a smaller spot size, which is not favourable to make very thin films.

Large spot size and good film formation is obtained from DPGDA which possesses approximately the same value of surface tension as the substrate (TPGDA).

EXAMPLE 4

A number of fluids were applied at room temperature by the ink jet printer described in Example 1 over an area of 1 cm×0.5 cm. The film thickness was controlled by optimising the number of droplets and the distance between adjacent spots. Normally, a small number of droplets and a larger distance between droplets is favourable to make a thin film. The in-flight diameter of each drop was 50 cm.

1. HDDA (see Example 1 for abbreviations) was applied onto a glass slide. Very good film formation was observed.
2. PONPGDA was applied on a polycarbonate disc. The fluid spread very well on the substrate and a thin film was formed. However, a slight corrosion of the substrate surface was observed after several hours.
3. DPGDA on TPGDA-coated glass slide. Good film formation and thin films (approximately 4 μm in thickness) were obtained. This shows possibilities to make multi-layer thin films.

to avoid jet clogging due to solvent evaporation: under this circumstance, only low solid content in the solvents could be tolerated.

A diluted LPP solution was jetted onto a glass substrate by a piezo inkjet system as described in Example 1. The droplets were directed at an array of locations on the substrate by stepping the location of the head between droplets (see Table 2 for details of the step sizes). The droplet size varied from 100 to 500 μm, depending on wetting behaviour of droplets on the substrate and jetting conditions.

The dwell volts and printhead step properties were kept in a similar range. The interval distance between each droplet was set at a range of 50 to 500 μm, according to droplet size.

After the solvents were evaporated, a dry LPP film was formed. By using the above technique, a film with a thickness less than 1 μm was obtained. The shape of thin film can also be controlled. The results are set out in Table 2. It was relatively difficult to achieve good film formation from solvent compositions.

TABLE 2

| Concentration of LPP F-301 | Solvents | Dwell Voltage (V) | Step Size (X * Y) (mm) | Comments |
| --- | --- | --- | --- | --- |
| 2% | Cyclopentanone | 21 | 0.05 × 0.1 | Uneven film because evaporation of cyclopentanone was not slow enough. |
| 0.5% | Cyclohexanone | 21 | 0.1 × 0.1 | Better film formation, but not very uniform, because relatively low dissolvability of cyclohexanone. |
| 0.5% | Cyclopentanone 75% Cyclohexanone 25% | 21 | 0.1 × 0.1 | Phase separation occurred during film drying. |
| 0.4% | Cyclopentanone 60% Cyclohexanone 20% IPA 20% | 21 | 0.1 × 0.1 | Good wetting ability and film formation, however, pin holes in the film due to phase separation of solvents during evaporation. |
| 0.4% | Cyclopentanone 20% Cyclohexanone 80% | 21 | 0.8 × 0.8 | Uniform thin film with thickness less than 1 μm. |

EXAMPLE 5

A linear photopolarisable polymer (LPP) type F301. obtainable from Vantico A.G., Basel, Switzerland was dissolved in various solvents at concentrations of 0.3-1% (w/w). Low vapour pressure solvents or mixtures of such solvents were used to ensure a good film formation from droplets deposited on a substrate. Such solvents include cyclohexanone, cyclopentanone, ethyl-lactate, etc.. Other solvents that can be used to modify physical properties of polymer solution include methyl ethyl ketone (MEK), isopropanol and methyl isobutyl ketone. Room temperature jetting was used in order

EXAMPLES 6 TO 11

In the following Examples 6 to 11, the following raw materials were used:

TABLE 3

| Material name | Code | Source |
| --- | --- | --- |
| Curable Liquid Crystalline Acrylic Monomer Formulated in Cyclopentanone | OPALVA 2140 CP 10 | Vantico AG |
| Benzyl acrylate | | Osaka Organic Chemical |
| Irgacure 369 photoinitiator | | Ciba Specialty Chemicals |

TABLE 3-continued

| Material name | Code | Source |
|---|---|---|
| Cyclopentanone | | Fluka |
| Linearly Polymerisable Polymer | LPP StarAlign 2110 ™ | Vantico AG |

In Examples 6-11, the various formulations were prepared by mixing specified components under yellow light at room temperature until a homogeneous composition is obtained, as detailed below.

The compositions used in Examples 6 to 11 are set out in Table 4 below, together with the physical properties of the various liquids (viscosities and surface tensions, since jet performances are strongly influenced by such properties); all parts are by weight. The formulations are all stored at room temperature in brown bottles to avoid exposure to UV-visible light.

TABLE 4

Composition of the Formulations

| Material | Examples 6, 7 | Examples 8, 9 | Examples 10, 11 |
|---|---|---|---|
| OPALVA 2140 (Powder) | 40.1 | 59.5 | 5.00 |
| Benzyl acrylate (reactive solvent) | 59.3 | 39.9 | 0 |
| Irgacure 369 | 0.6 | 0.6 | 0 |
| Cyclopentanone (non-reactive solvent) | 0 | 0 | 95 |
| Total % mass | 100 | 100 | 100 |
| Viscosity (mPas) | 21 | 67 | 3 |
| Surface tension (dynes/cm) | 37 | 37 | 28 |

Two types of substrates were used in Examples 6-11:
1. Glass plates (Liquid Crystal Display (LCD) quality) which were cleaned before use.
2. LPP-coated glass plates. An LPP alignment layer (formulation Staralign™ 2110 (from Vantico AG, CH-Basel) has a 2% weight solid content in cyclopentanone) can be obtained either by
   (a) jetting the LPP formulation on glass and exposing the sample to linearly polarized W-light (wavelength range typical 280-330 nm) after drying. A suitable formulation and corresponding jetting conditions are described in Example 5. The thickness of the LPP jetted layer is 0.93 μm, or
   (b) spin-coating the Staralign™ 2110 LPP formulation on glass. Typical spin-coating conditions are 3000 rpm during 60 sec. The LPP layers are dried after spin-coating in order to remove residual solvent. Such layers are typically 50-60 nm thick. Finally, the LPP layers are exposed to linearly polarized UV-light (typically 100 mJ/cm$^2$— wavelength range typical 280-330 nm).

In Example 6-11, a JetLab Printer (MicroFab Technologies Inc., Plano, Tex.) was used for jetting droplets of the compositions onto the above-described substrates. The volume of the jet droplet, drop density and printing patterns can be precisely controlled. The temperatures enabling stable jetting of the formulations are given in the Table 5 below. The objective was to obtain continuous films using the formulations described in Table 4 and using various drop densities at the best jetting conditions, as recorded in Table 5.

As will be seen, the substrate had a strong influence on the final film characteristics (See Table 5 below). Spreading of LCM (liquid crystalline monomer) formulations is poor on the plain glass substrate, i.e. not coated with any organic material, whereas thin films (less than 10 μm) were obtained on LPP coated glass plates.

After deposition, the samples were photochemically cured: before curing, the samples were heated at 60° C. in order to remove volatile materials. Heating also helps to orient the LCP layer (when LPP alignment layers are used, the orientation of the LCP layer is determined by the LPP layer). The LCP layers are then cured under nitrogen atmosphere using unpolarised, broad band either at regular UV exposure (e.g. high pressure mercury lamp, 500 mJ/cm2 at 365 nm) or at lower level exposure using "Black light", Model UVL-21, with a 4W UV lamp, from UVP Inc..

After curing, the layer thicknesses are measured with Alpha-Step® 500 Surface Profiler.

EXAMPLE 6

OPALVA 2140 was obtained as a powder by evaporating the cyclopentanone solvent * from the commercial product OPALVA 2140 CP 10. The powder comprises a liquid crystalline acrylic monomer, UV initiator, and stabiliser. 8.07 g of OPALVA 2140 powder and 101 mg of Irgacure 369 are mixed with 11.93 g of benzyl acrylate at room temperature and the mixture is stirred until a clear, slightly yellow homogeneous mixture is formed. The liquid formulation has a viscosity of 21 inPas at 25° C. and contains 40.1% active liquid crystalline monomer powder, 59.3% reactive solvent/diluent benzyl acrylate and 0.6% radical initiator Irgacure 369.

Single lines of the above composition were jetted onto the glass substrate, according to the conditions of Table 5. Thick lines (28 μm wide) were deposited, with little spreading (as compared to Example 7 below where the substrate was the LPP coated glass) to produce thin layers. The layers were cured, as set out above.

Birefringence (a characteristic of the liquid crystal material, seen as a bright line under crossed polarizers) appears fairly rapidly (1 to 5 min) after depositing. However, when continuous films are jetted, birefringence is recovered more slowly (>1 hour), especially for the thick films (>15 microns), deposited on untreated glass. The thicker the film, the slower is the birefringence recovery.

Benzyl acrylate curable diluent appears initially to destroy the liquid crystal organization of the LCP molecules. Careful curing restores the self organisation of the liquid crystalline materials. Curing with low UV energies seems to help the molecules to align. High intensity UV energies, on the other hand, cure rapidly the LCPs, such that the LC molecules cannot move, and, as a result, the optical display does not show any birefringence and the jetted film appears completely black under crossed polarizers even by rotating the sample.

EXAMPLE 7

Example 7 was identical to Example 6 except that LPP coated glass plates produced as set out in Example 5 were used instead of simple glass plates.

Thin, continuous films of 5.5 to 6 micron film thickness, of the composition described in Example 6, were obtained readily for drop densities higher than 5/mm, jetted at 60° C. This is in contrast to jetting directly on glass (Example 6). Thus the LPP layer enables greater spreading [4 times that of Example 6] of the deposited droplet, with better merging of adjacent droplets.

Non-continuous films were obtained for a drop density of 3 drops/mm or less.

The alignment of the LCP layer is facilitated by the LPP alignment layer and a film is readily obtained, showing bright / dark contrast when a jetted 2 layered composite film (i.e. a film formed by a LPP alignment layer and a LCP layer) is rotated under crossed polarisers. The LCP alignment is brought about by the LPP layer, and is best achieved for LCP layers thinner than 10 microns.

When thick LCP films (typically >15 μm obtained using drop densities of >20/mm) are jetted, no difference is noted between LPP-coated and non-coated glass plates: under these conditions, the LPP layer looses its role of alignment layer.

It is surprising that benzyl acrylate acting as a reactive diluent, facilitates good film formation, and, under certain controlled conditions (layer thickness, UV exposure conditions), does not interfere in the attainment of the required optical activity in the jetted OPALVA curable liquid crystalline monomer.

This example represents a film composed of 2 jetted layers (i.e. a LPP alignment layer and a LCP layer), each of thickness less than 10 microns and comprising different components and compositions.

EXAMPLES 8, 9

11.98 g of OPALVA 2140 powder and 120 mg of Irgacure 369 are mixed with 8.02 g of benzyl acrylate at room temperature and the mixture is stirred until a clear homogeneous, slightly yellow mixture is formed. The liquid formulation has a viscosity of 67 mPas at 25° C. and contains 59.5% liquid crystalline monomer mixture, 0.6% radical initiator Irgacure 369, and 39.9% reactive diluent.

The composition was deposited as in Example 7 on an LPP coated plate, except that jetting was conducted at higher temperatures (75° C. instead of 60° C.), to account for the higher content of the OPALVA 2140 and higher resultant viscosity. This higher jetting temperature condition resulted in thinner, more homogenous films of 2.9 micron or 3.5 micron thickness respectively for Examples 8, 9. Coating thickness was assessed after full curing of the jetted film under nitrogen. The essential difference between Examples 8 and 9 is the greater spacing between the lines of the deposit in Example 8 as compared to Example 9 (see table 5).

Continuous films are obtained for drop density higher than 10/mm with appropriate line spacing. Birefringence recovery needs more time than for Examples 6, and 7, due to higher viscosity.

EXAMPLES 10, 11

10 g of OPALVA 2140 CP 10 are mixed with 10 g of cyclopentanone. A clear and slightly yellow mixture is obtained. The liquid formulation has a low viscosity of 3 mPas at 25° C.

The composition was deposited as in Example 6 and 7 on and LPP coated plates at a droplet density of 10 (Example 10) and 20 (Example 11) droplets/mm. In the case of this non-reactive solvent-based formulation, thin films of 2.2 micron were obtained, but film homogeneity was poor, even at high drop densities (20/mm). There is patchy film formation. Thus the formulations of Examples 6, 7, 8, 9 containing the reactive diluent benzyl acrylate, yield surprisingly thin, good quality films, with retention of optical properties. The optical contrast for Examples 10 and 11 is also much weaker than observed for the corresponding benzyl acrylate-based formulations (Examples 6, 7, 8, 9). Contrary to the time-effect of appearance of the optical effects in Examples 6, 7, 8 and 9, there were no time-effect on the optical performances in Examples 10, 11. However the quality of the deposits was poor.

The process conditions and results of Examples 6-11 are set out in Table 5

Table 5: Results of the Ink-Jet trial

| Example | 6 | 7 | 8 | 9 | 10 | 11 |
|---|---|---|---|---|---|---|
| Dwell Voltage (V) | 50 | 50 | 85 | 85 | 40 | 40 |
| Dwell (µs) | 45 | 45 | 55 | 55 | 50 | 50 |
| Frequency (Hz) | 4000 | 4000 | 4000 | 4000 | 4000 | 4000 |
| Jet temp (°C) | 60 | 60 | 75 | 75 | 40 | 40 |
| Stability of jetting | Good | Good | Acceptable | Acceptable | Acceptable | Acceptable |
| Substrate | Uncoated, but cleaned Glass | LPP coated glass (50 nm) | LPP coated glass (50 nm) | LPP coated glass (50 nm) | LPP coated glass (50 nm) | LPP coated glass (50 nm) |
| Pattern | Line | Rectangular film | Line | Rectangular film | Line | Rectangular film |
| Droplets / mm | 6 | 5 | 10 | 10 | 10 | 20 |
| Line space in mm | 0.1 | 0.2 | 1.5 for A 2 for B | 0.1 | 0.1 | 0.1 |
| LCP film thickness (µm) | 28 (curved) | 5.5-6 (homogeneous) | 2.9 (homogeneous) | 3.5 (homogeneous) | 2.2 (homogeneity not good) | 1.8 (homogeneity not good) |
| LC effect performance | Good birefringence | Good contrast | Good contrast | Good contrast | Contrast weak | Contrast weak |
| Picture |  |  | A.  B.  | C.  |  |  |

EXAMPLE 12

After the pattern B (See the Table 5 above) corresponding to Example 9 (drop density of 10/mm) is cured under low UV energy, lines of Formulation DPGDA (Acrylate formulation of Example 4) are jetted in-between the LCP 5 lines (Drop density=10 drops/mm). The pattern is completely cured under 500 mJ/cm² at 365 nm.

EXAMPLES 13 TO 17

In the following Examples 13 to 17, the compositions set out in Table 6 were used:

TABLE 6

| | Example | | | | |
|---|---|---|---|---|---|
| | 13 | 14 | 15 | 16 | 17 |
| OPALVA4120* | 47 | 52 | 42 | 32 | 32 |
| SR339 | 50 | 25 | 40 | 30 | 65 |
| Cyclopentanone | | 23 | 10 | 38 | |
| Byk307 | | | 0.1 | | |

LCP IPE053: Liquid crystal polymer from OPAL, Vantico, Switzerland
SR339: Phenoxyethyl acrylate from Sartomer, i.e. a curable diluent
Cyclopentanone: Solvent from Aldrich, i.e. a non-curable diluent
Byk307: Silicone surface additive from Byk Chemie In Examples 13 to 17, LCP fluids were jetted onto a glass plate coated with an optically aligned LPP coating from Example 5 using a single jet head supplied by Microfab Technologies Inc. Two representative fluids were jetted, which are Example 13, 47% LCP in a reactive diluent (SR339), and Example 16, 32% LCP in a mixture of reactive diluent SR399 and a non-reactive solvent (cyclopentanone). The printed LCP patterns were finally cured with a UV source (Fusion F450, 120W/cm²), using two passes at a speed of 10 m/min. The results are given in Table 7.

TABLE 7

| Example | Temp/ °C. | Dwell Voltage/V | Frequency/ Hz | Line space/mm | Droplets Per mm | Pattern | LC Effect |
|---|---|---|---|---|---|---|---|
| 13 | 85 | 18 | 2000 | 0.1 | 50 | Rectangular film | Good |
| 13 | 85 | 18 | 2000 | 0.1 | 20 | Rectangular film | Good |
| 13 | 85 | 18 | 2000 | 0.1 | 4 | Un-jointed droplets | Not good |
| 16 | 65 | 25 | 4000 | 0.1 | 6 | Rectangular thin film | Weak |

Thus best films are achieved with the reactive diluent SR399 with droplets >20 drops per mm. Lower droplet rate per mm resulted in discontinuous films.

Fluids shown in Table 4 were jetted onto a LPP coated glass plate and cured by a UV source and the birefringence effect (optical anisotropy) was observed. Birefringence (LC effect) occurred in all the samples, even in Example 17, with only 30% LCP in the reactive diluent.

Example 13 (45% LCP) composition was jetted onto a LPP coated glass plate, produced according to Example 5 and cured by TV radiation. Then the composition of Example 17 (30% LCP) was jetted on part of the Example 13 layer and then cured by UV. The birefringence effect was different between the Example 13 single layer and Example 13/17 multi-layers.

The invention claimed is:

1. A method of forming a film comprising of at least one layer of at least one resin, which method comprises directing droplets of a liquid composition comprising:
   a) the said at least one resin; and
   b) at least one curable diluent onto an array of locations on a substrate, the liquid composition being such that the droplets, on impact with the substrate, spread out to form droplet relics on the substrate that have a diameter at least 1.4 times the diameter of the droplets in flight, such that adjacent droplets merge to form a continuous layer of substantially uniform thickness on the substrate; and curing the curable materials in the continuous layer to solidify the layer, wherein said composition contains substantially no non-curable diluent and wherein the layer has a thickness of less than 10 μm and wherein the said resin comprises liquid cristals and the film includes a liquid crystal alignment layer under the said liquid crystal layer.

2. A method as claimed in claim 1, wherein the liquid crystal alignment layer is deposited by directing droplets of a liquid onto the substrate and is photocured or photoisomerised under polarised light.

3. A method as claimed in claim 1, wherein the liquid crystal alignment layer orientates the liquid crystals in the liquid crystal layer in two or more different directions.

4. A method as claimed in claim 1, and further comprising cross-linking the liquid crystals to an extent sufficient to maintain the birefringence of the liquid crystals.

5. A method as claimed in claim 1, wherein the curable diluent used to deposit the liquid crystal layer is an acrylate, a methacrylate, a vinyl ether, or a compound containing an allyl or a styryl group.

6. A method as claimed in claim 1, wherein the curable diluent is an acrylate or methacrylate containing at least one aromatic ring.

* * * * *